(12) United States Patent
Byun et al.

(10) Patent No.: US 9,794,175 B2
(45) Date of Patent: Oct. 17, 2017

(54) TRANSMITTING A DATA PACKET IN A CONTENT-CENTRIC NETWORK

(71) Applicant: Samsung Electronics Co., Ltd., Suwon-si (KR)

(72) Inventors: Do Jun Byun, Seoul (KR); Byoung Joon Lee, Seongnam-si (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 669 days.

(21) Appl. No.: 14/158,159

(22) Filed: Jan. 17, 2014

(65) Prior Publication Data

US 2014/0204945 A1 Jul. 24, 2014

(30) Foreign Application Priority Data

Jan. 18, 2013 (KR) .................. 10-2013-0005730

(51) Int. Cl.
*H04L 12/741* (2013.01)
*H04L 29/08* (2006.01)
*H04L 29/12* (2006.01)

(52) U.S. Cl.
CPC ............ *H04L 45/74* (2013.01); *H04L 67/327* (2013.01); *H04L 61/103* (2013.01)

(58) Field of Classification Search
CPC ..... H04L 45/74; H04L 67/327; H04L 61/103; H04L 47/24; H04L 69/00
See application file for complete search history.

(56) References Cited

U.S. PATENT DOCUMENTS

| | | | |
|---|---|---|---|
| 7,206,861 B1* | 4/2007 | Callon | H04L 47/10 370/389 |
| 7,318,099 B2 | 1/2008 | Stahl et al. | |
| 7,876,765 B2 | 1/2011 | Gofman et al. | |
| 8,705,531 B2* | 4/2014 | Manzella | H04L 49/109 370/390 |
| 2002/0116481 A1* | 8/2002 | Lee | H04L 29/06 709/220 |
| 2005/0010653 A1* | 1/2005 | McCanne | H04L 69/329 709/219 |
| 2009/0259755 A1* | 10/2009 | Boucachard | H04L 12/4633 709/227 |

(Continued)

FOREIGN PATENT DOCUMENTS

KR 10-2011-0125481 A 11/2011
KR 10-2012-0038187 A 4/2012

*Primary Examiner* — Ian N Moore
*Assistant Examiner* — Latresa McCallum
(74) *Attorney, Agent, or Firm* — NSIP Law

(57) ABSTRACT

A method of transmitting a data packet from a content provider in a content-centric network CCN includes verifying whether a content request packet requesting a content identical to a content of a content request packet being received from a content requester is present in a pending interest table (PIT), increasing a value of a counter corresponding to the content request packet, comparing the value of the counter to a predetermined threshold value, and transmitting a data packet using a predefined broadcast media access control (MAC) address in response to the content request packet being received and the value of the counter being greater than or equal to the threshold value.

19 Claims, 4 Drawing Sheets

(56) References Cited

U.S. PATENT DOCUMENTS

| | | | |
|---|---|---|---|
| 2009/0268746 A1* | 10/2009 | Ogasahara | H04L 12/413 |
| | | | 370/406 |
| 2010/0195655 A1 | 8/2010 | Jacobson et al. | |
| 2011/0107436 A1* | 5/2011 | Cholas | H04N 21/2541 |
| | | | 726/29 |
| 2011/0213681 A1 | 9/2011 | Shahid | |
| 2011/0317698 A1 | 12/2011 | Wiget et al. | |
| 2012/0008528 A1 | 1/2012 | Dunbar et al. | |
| 2012/0014387 A1 | 1/2012 | Dunbar et al. | |
| 2012/0036180 A1 | 2/2012 | Thornton et al. | |
| 2012/0158997 A1 | 6/2012 | Hsu et al. | |
| 2012/0317613 A1* | 12/2012 | Kim | H04L 63/10 |
| | | | 726/1 |
| 2014/0044130 A1* | 2/2014 | Banavalikar | H04L 49/351 |
| | | | 370/392 |

\* cited by examiner

TRANSMITTING A DATA PACKET IN A CONTENT-CENTRIC NETWORK

CROSS-REFERENCE TO RELATED APPLICATIONS

This application claims the benefit under 35 USC 119(a) of Korean Patent Application No. 10-2013-0005730 filed on Jan. 18, 2013, in the Korean Intellectual Property Office, the entire disclosure of which is incorporated herein by reference for all purposes.

BACKGROUND

1. Field

This application relates to a method of transmitting a data packet from a content provider in a content-centric network (CCN) and a content provider.

2. Description of Related Art

In a name-based network, a content request packet, also called an interest, includes a hierarchical name of a content desired to be fetched. Accordingly, when nodes in the name-based network receive a content request packet, the nodes forward the content request packet to an interface in a direction toward a node in which a content corresponding to the content name included in the content request packet is cached.

The node in which the corresponding content is cached searches for the content based on the received content name, and forwards the corresponding content to the interface through which the content request packet is passed, also known as a face, to transmit the content to the node requesting the content. Also, the nodes in the name-based network receive a data packet in response to the content request packet being received.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of transmitting a data packet from a content provider in a content-centric network (CCN) includes verifying whether a content request packet requesting a content identical to a content of a content request packet being received from a content requester is present in a pending interest table (PIT); increasing a value of a counter corresponding to the content request packet based on a result of the verification; comparing the value of the counter to a predetermined threshold value; and transmitting a data packet using a predefined broadcast media access control (MAC) address in response to the content request packet being received and the value of the counter being greater than or equal to the threshold value.

The transmitting of the data packet may include transmitting the data packet using the broadcast MAC address in response to the content request packet being received and a next hop node of the data packet being a node located within a wireless broadcast range and the value of the counter being greater than or equal to the threshold value.

The threshold value may be determined based on an amount of bandwidth usage used to broadcast the data packet.

The transmitting of the data packet may include transmitting the data packet using a unicast MAC address in response to the content request packet being received and the value of the counter being less than the threshold value.

The transmitting of the data packet may include transmitting the data packet using the unicast MAC address recognized from a CCN over address resolution protocol (ARP) packet corresponding to a CCN protocol address in response to the content request packet being received.

The transmitting of the data packet may include transmitting the data packet a number of times equal to the value of the counter using the unicast MAC address in response to the content request packet being received.

The method may further include obtaining the unicast MAC address from a MAC address of the content requester included in the content request packet or a CCN over ARP packet corresponding to the content request packet.

The protocol address of the CCN over ARP packet may include a unique identifier of a CCN node.

The unique identifier may include a hash value of a public key of the CCN node.

A length of the unique identifier may be variable.

The CCN over ARP packet may include any one or any combination of a CCN protocol type, a CCN protocol address length, a sender protocol address, and a target node protocol address.

The CCN protocol address length may be determined based on a longer length among the sender protocol address length and the target node protocol address length.

A shorter protocol address may be padded using one or more end marker bytes to make a length of the shorter protocol address length equal to the CCN protocol address length in response to the sender protocol address or the target node protocol address being shorter than the CCN protocol address length.

The sender protocol address field may include a unique identifier of a sender; and the target node protocol address field may include a unique identifier of a target node.

In another general aspect, a non-transitory computer-readable storage medium stores a program for controlling a computer to perform the method described above.

In another general aspect, a content provider for transmitting a data packet in a content-centric network (CCN) includes a receiver configured to receive a content request packet from a content requester; a processor configured to verify whether a content request packet requesting an identical content is present in a pending interest table (PIT) in response to the content request packet being received, increase a value of a counter corresponding to the content request packet based on a result of the verification, and compare the value of the counter to a predetermined threshold value; and a transmitter configured to transmit a data packet using a predefined broadcast media access control (MAC) address in response to the content request packet being received and the value of the counter being greater than or equal to the threshold value.

The transmitter may be further configured to transmit the data packet, in response to the content request packet being received, using the broadcast MAC address in response to a next hop node of the data packet being a node located within a wireless broadcast range and the value of the counter being greater than or equal to the threshold value.

The transmitter may be further configured to transmit the data packet, in response to the content request packet being received, using a unicast MAC address recognized from a CCN over address resolution protocol (ARP) packet corresponding to a CCN protocol address in response to the value of the counter being less than the threshold value.

The transmitter may be further configured to transmit the data packet a number of times equal to the value of the counter using the unicast MAC address in response to the content request packet being received.

The content provider may further include an address obtainer configured to obtain the unicast MAC address from a MAC address of the content requester included in the content request packet or a CCN over ARP packet corresponding to the content request packet.

In another general aspect, a method of transmitting a data packet from a content provider in a content-centric network (CCN) includes verifying whether a content request packet requesting a content identical to a content of a content request packet being received from a content requester is present in a pending interest table (PIT); increasing a value of a counter corresponding to the content request packet in response to the content request packet being present in the PIT; comparing the value of the counter to a predetermined threshold value; and determining how to transmit a data packet in response to the content request packet being received and a result of the comparing.

The determining may include determining to transmit the data packet using a unicast media access control (MAC) address recognized from a CCN over address resolution protocol (ARP) packet corresponding to a CCN protocol address in response to the value of the counter being less than the threshold value; and determining to transmit the data packet using a predefined broadcast MAC address in response to the content request packet being received and the value of the counter being greater than or equal to the threshold value.

The method may further include searching a forwarding information base (FIB) for an entry corresponding to the content packet in response to the content request packet not being present in the PIT.

Other features and aspects will be apparent from the following detailed description, the drawings, and the claims.

DETAILED DESCRIPTION

Figure 1:
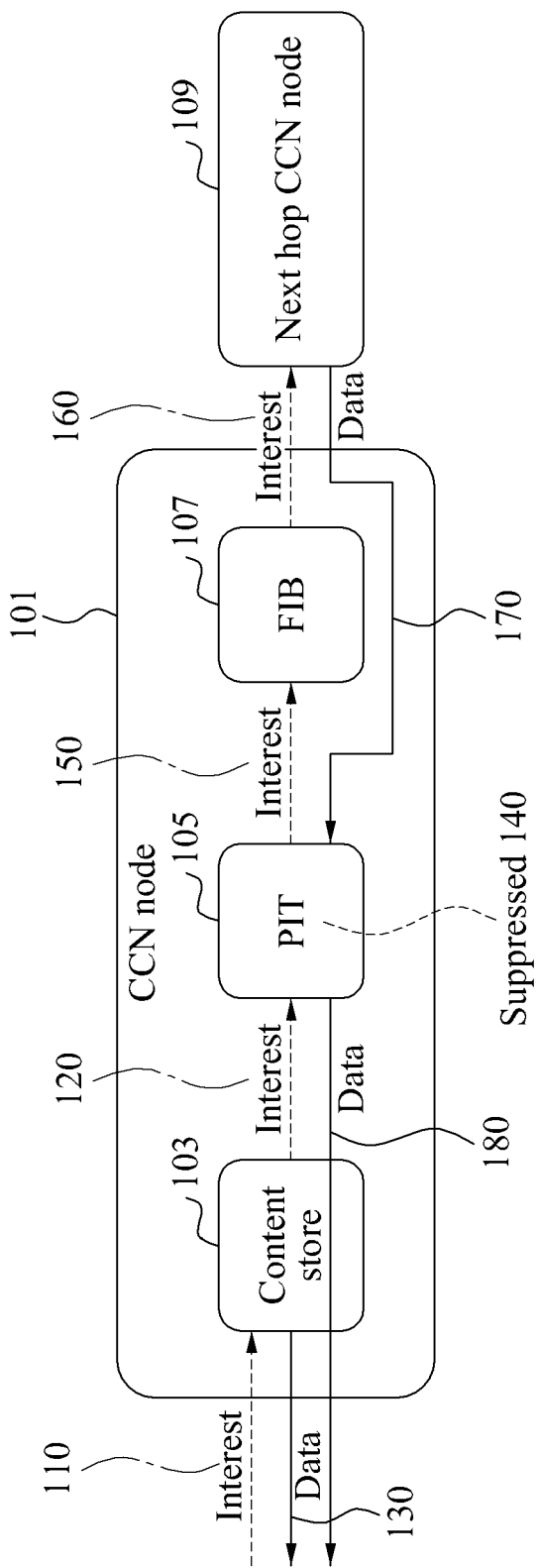
FIG. 1 illustrates an example of a procedure of processing a content request packet in a content-centric network (CCN).

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 illustrates an example of a procedure of processing a content request packet in a content-centric network (CCN).

In a CCN, a name of a content may perform a compass function to locate a node in which the content is cached, and may be used to identify the content. Accordingly, a unique name is used for a respective content. As such, two contents having different names may be recognized to be different contents even though the contents of the two contents are identical. For example, when the contents of two files are identical but have different content names of "/ABC.com/sait/video/intro.avi" and "/ABC.com/sait/comm/video/intro.avi", the contents of the files may be recognized to be different. The preceding rule may be useful for distinguishing different contents having similar content names.

In FIG. 1, to describe an example of a process of fetching a corresponding content based on a hierarchical name of the content, a procedure of processing a content request packet in one of the examples of a name-based network, a CCN node is illustrated. Hereinafter, a CCN node may be a network device in a CCN, for example, a mobile terminal, a content provider, or a content requester.

Hereinafter, a content provider may be a node or router that originally owns or stores a content requested from a content requester, and a content requester may be a node or router that requests the corresponding content.

In 110, a CCN node 101 receives a content request packet, i.e., an interest.

In 130, the CCN node 101 verifies whether the requested content or data is stored in a content store (CS) 103, and transmits the stored data when the requested content or data is stored in the CS 103.

In 120, when the requested content or data is absent in the CS 103, the CCN node 101 transmits the content request packet to a pending interest table (PIT) 105. The CCN node 101 verifies whether a content request packet having the same name received from another face is present in the PIT 105.

When the content request packet having the same name is present in the PIT 105, the CCN node 101 increases a counter corresponding to the content request packet.

In 140, the CCN node 101 adds an incoming face to the PIT 105, and suppresses the content request packet.

In 150, when the content request packet having the same name is absent in the PIT 105, the CCN node 101 transmits the content request packet to a forwarding information base (FIB) 107. The CCN node 101 may execute a longest prefix match for entries in the FIB 107 and the content name included in the content request packet to search for a corresponding FIB entry in the FIB 107.

In 160, the CCN node 101 transmits the content request packet to a next hop CCN node 109 through a face of the selected FIB entry. Each face may represent a certain node, and a CCN over address resolution protocol (ARP) packet may be used to find a layer 2 media access control (MAC) address of a node.

In one example, the CCN over ARP packet may be used to transmit a control packet for generating a face as well as to transmit a content request packet and a data packet.

In 170, the CCN node 101 receives a data packet including the requested content from the next hop CCN node 109.

In 180, the CCN node 101 looks up a matching entry in the PIT 105, and transmits the corresponding data packet to an incoming face(s) corresponding to the matching entry found in the PIT 105.

Figure 2:
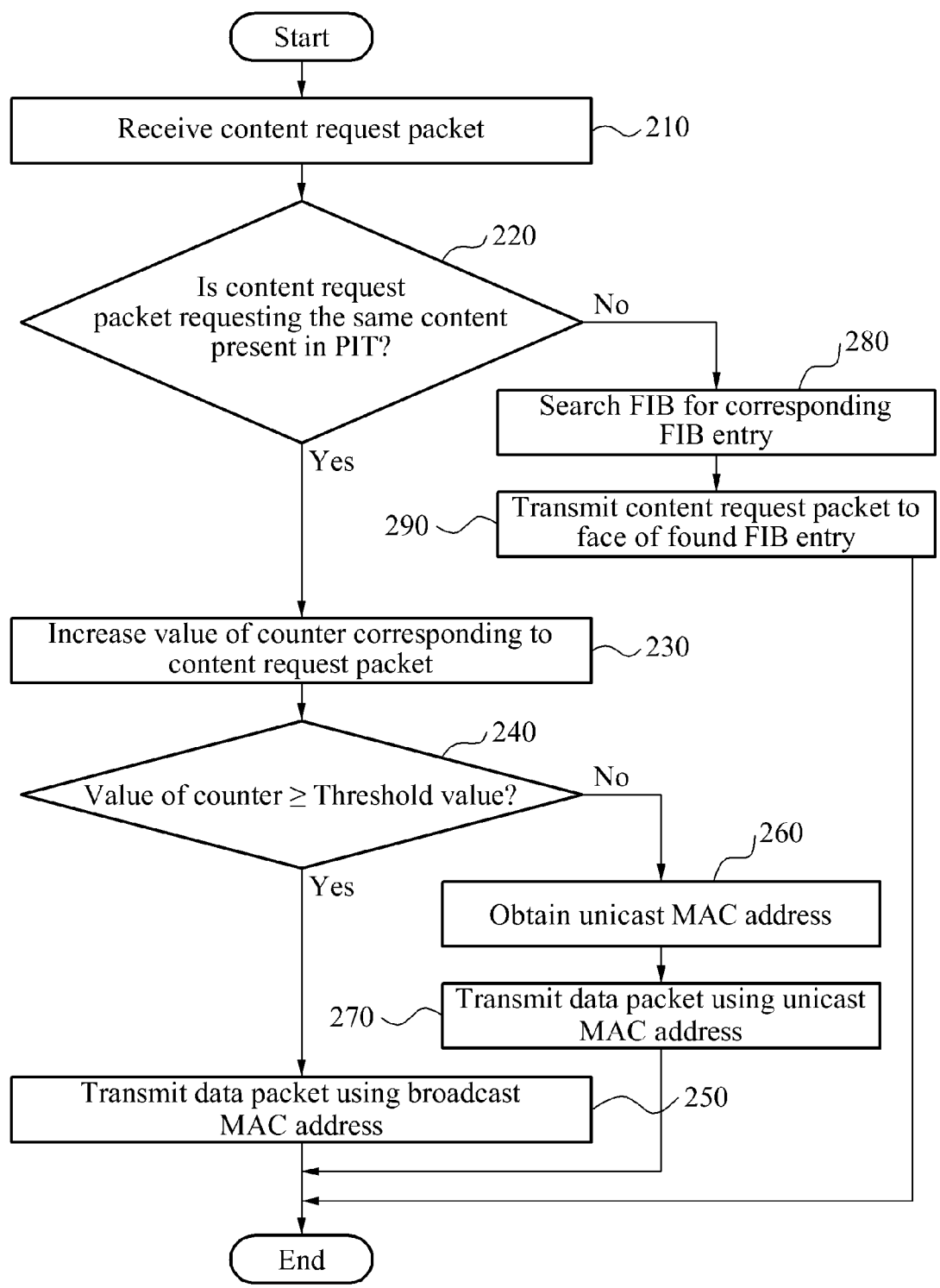
FIG. 2 illustrates an example of a method of transmitting a data packet from a content provider in a CCN.

In response to the content request packet being received, the content provider transmits the corresponding data packet using a CCN over ARP packet by a method of FIG. 2 or using a MAC address of a sender of the content request packet, i.e., a content requester, obtained from the content request packet.

However, when the same content is requested from a plurality of content requesters, data of the requested content may be transmitted a number of times equal to a number of the content requesters, resulting in reduced efficiency.

Accordingly, in one example, a counter operable to count a number of content request packets requesting the same content in a PIT may be used to determine whether to transmit a data packet using a unicast MAC address or a broadcast MAC address.

FIG. 2 illustrates an example of a method of transmitting a data packet from a content provider in a CCN.

Referring to FIG. 2, a method of selecting an optimal address from a unicast MAC address and a broadcast MAC address for a content provider to transmit a data packet is illustrated.

In 210, the content provider receives a content request packet from a content requester.

In 220, the content provider verifies whether a content request packet requesting a content identical to a content of the received content request packet is present in a PIT of the content provider.

In 230, when the content request packet requesting the identical content is present in the PIT, the content provider increases a value of a counter corresponding to the content request packet.

In 240, the content provider compares the value of the counter to a predetermined threshold value X.

The threshold value X may be determined based on an amount of bandwidth utilized to broadcast a data packet.

In one example, a standard for selecting a unicast MAC address or a broadcast MAC address may be defined as whether a counter corresponding to the same content request packet is greater than or equal to a predetermined limit, for example, a threshold value, in a PIT entry mapped to a data request packet.

The above may be available in a local area in which broadcasting is easy, and may improve the efficiency of bandwidth usage in a wireless local area network, for example, a Wi-Fi network.

In 250, when a result of the comparison in 240 is that the value of the counter is greater than or equal to the threshold value, the content provider transmits a data packet using a broadcast MAC address in response to the content request packet being received. The broadcast MAC address may be to a predefined value, for example, FF:FF:FF:FF:FF:FF.

The content provider may transmit the data packet using the broadcast MAC address in response to the content request packet being received when a next hop node of the data packet is a node located within a wireless broadcast range and the value of the counter is greater than or equal to the threshold value. The wireless broadcast range may be, for example, a Wi-Fi downlink.

In 260, when a result of the comparison in 240 is that the value of the counter is less than the threshold value, the content provider obtains a unicast MAC address. The content provider may obtain the unicast MAC address from a MAC address of the content requester included in the content request packet or a CCN protocol address, for example, a CCN over ARP packet corresponding to the content request packet.

The CCN over ARP packet will be described in further detail with reference to FIG. 3.

In 270, the content provider transmits the data packet using the unicast MAC address obtained in 260 in response to the content request packet being received. The content provider may transmit the data packet a number of times equal to the value of the counter, for example, a number of content requesters requesting the same content, using the unicast MAC address in response to the content request packet being received.

In 280, when a content request packet requesting a content identical to a content of the received content request packet is absent in the PIT, the content provider may search an FIB, also known as a forwarding table, for a corresponding FIB entry as described with reference to FIG. 1.

In 290, the content provider transmits the content request packet to a face of the found FIB entry.

Figure 3:
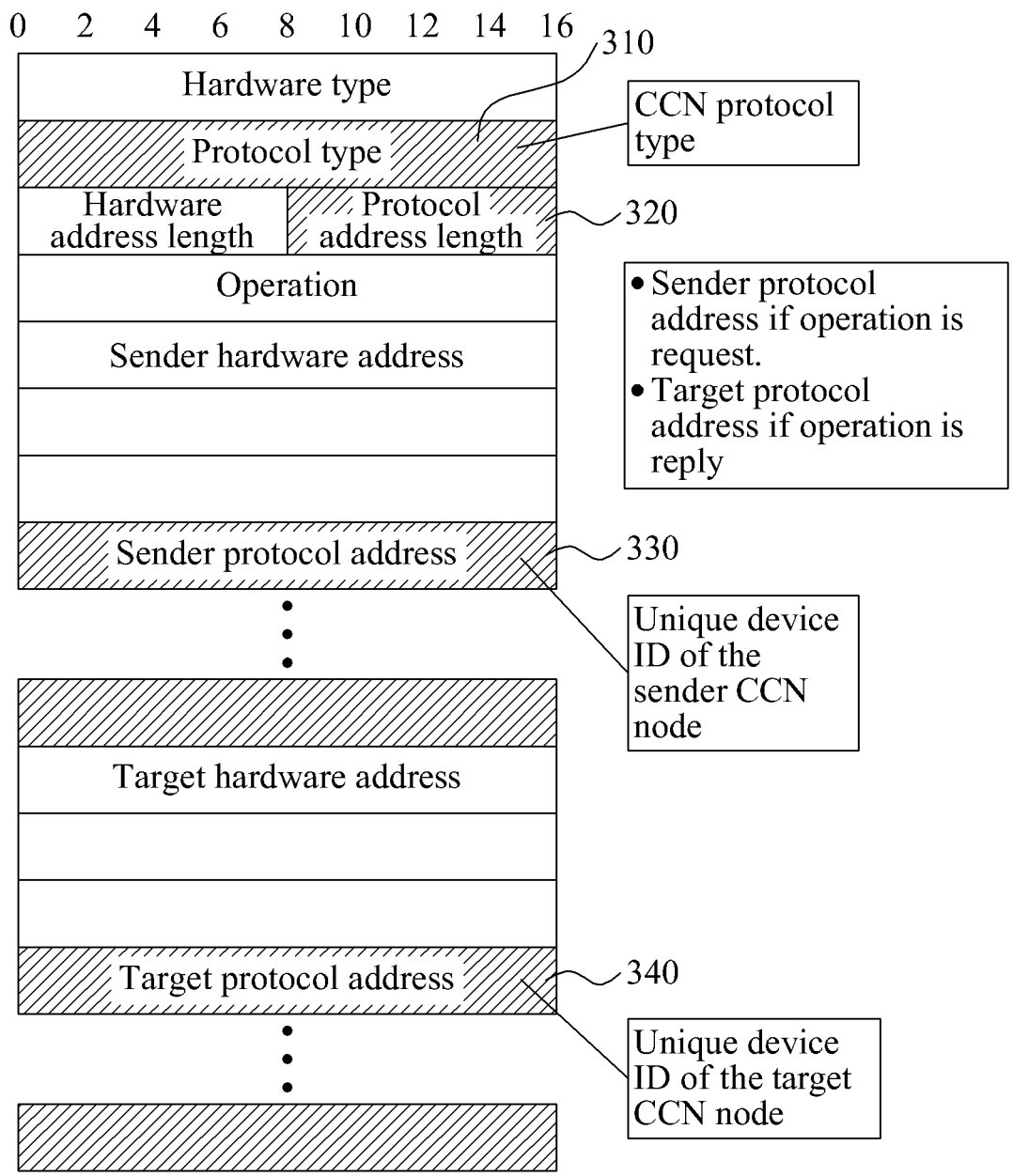
FIG. 3 illustrates an example of a structure of a CCN over address resolution protocol (ARP) packet.

FIG. 3 illustrates an example of a structure of a CCN over ARP packet.

ARP is a protocol used for mapping between a layer 3 address and a layer 2 address. In a CCN, as an alternative to Internet protocol (IP), mapping between a layer 2 address and a CCN address may be required through ARP.

In this instance, a CCN node may transmit a packet to a next hop node using a layer 2 MAC address of the next hop node.

Accordingly, in one example, mapping between a layer 2 MAC address and a layer 3 CCN protocol address may be enabled using a CCN over ARP packet, whereby a CCN protocol may be used directly in a layer 3 as a network layer.

The CCN over ARP packet will now be described in further detail.

An ARP request procedure in a CCN may be similar to that of an IP; however, an ARP packet, in particular, a protocol type field, a protocol address length field, a sender protocol address field, and a target protocol address field, may be modified to a format of a CCN over ARP packet.

Referring to FIG. 3, a CCN over ARP packet includes any one or any combination of a CCN protocol type 310, a CCN protocol address length 320, a sender protocol address 330, and a target node protocol address 340.

The CCN protocol type 310 may specify a newly defined CCN type or a protocol type, for example, 0x0806, for backward compatibility.

Use of an EtherType having a value of, for example, 0x0806 may avoid overhead and compatibility issues caused by standardization involving adding a CCN EtherType. However, a compatibility issue may also arise, and a new CCN EtherType may be added if 0x0806 no longer works.

The CCN protocol address length 320 may be determined based on a longer value among a sender protocol address length and a target node protocol address length, in view of the CCN protocol address length 320 being variable.

The CCN protocol address length 320 may be a sender protocol address length in a case of an ARP request, and may be a target node protocol address length in a case of an ARP reply.

When the sender protocol address 330 or the target node protocol address 340 is shorter than the CCN protocol address length 320, the shorter protocol address may be padded using one or more end marker bytes. As an example, a length of a protocol address shorter than a protocol address length may be padded by concatenating one or more end marker bytes, for example, 0x00, to a protocol address value to make the length of the protocol address equal to the protocol address length.

The sender protocol address 330 field includes a unique identifier of a sender. Also, the target node protocol address 340 field includes a unique identifier of a target node.

The CCN, in which a name of a content serves as a compass for tracing a node in which the content is cached, is a protocol that does not need an address of a sender sending a packet. However, in one example, a sender protocol address may be included in an ARP packet, whereby a target node may enable mapping between a sender protocol address and a hardware address absent a further ARP request. Also, in one example, a sender protocol address may be used for compatibility with an ARP packet structure.

In one example, when a CCN packet is used in a layer 2 directly absent an IP overlay, a protocol address of a CCN over ARP packet may include a unique identifier of a CCN node. The unique identifier may include a hash value of a public key of the CCN node, and a length of the unique identifier may be variable.

When a CCN packet is used in a layer 2 directly absent an IP overlay, a protocol address length of a CCN over ARP packet may be a longer value of a sender protocol address length and a target node protocol address length.

Generally, a protocol address of CCN may be a name of a content conceptually. However, when a protocol address of CCN is used as a protocol address of ARP, a cross-layer issue between an ARP table and a routing table may occur. Also, a scalability issue may arise from one-to-many mapping between a hardware address and a protocol address rather than one-to-one mapping.

In one example, to overcome these issues and to provide a CCN over ARP packet, a protocol address of CCN may be defined as follows:

1. Each CCN node may have a unique identifier. The unique identifier may correspond to a hash value of a public key of a network device corresponding to a CCN node.

2. A length of a unique identifier of each CCN node may be variable.

3. A unique identifier of each CCN node may be exchanged in advance by a routing protocol, and when an ARP request is made, each CCN node may already know about a unique identifier of a next hop node being shared.

4. In a CCN, information being exchanged by a routing protocol may correspond to a mapping table between a prefix included in a content or a content request packet and a unique identifier of a CCN node.

In one example, by using the CCN over ARP packet, efficient multicast may achieved using data in a PIT of CCN in an environment in which network resources are limited, such as, for example, a Wi-Fi network.

Figure 4:
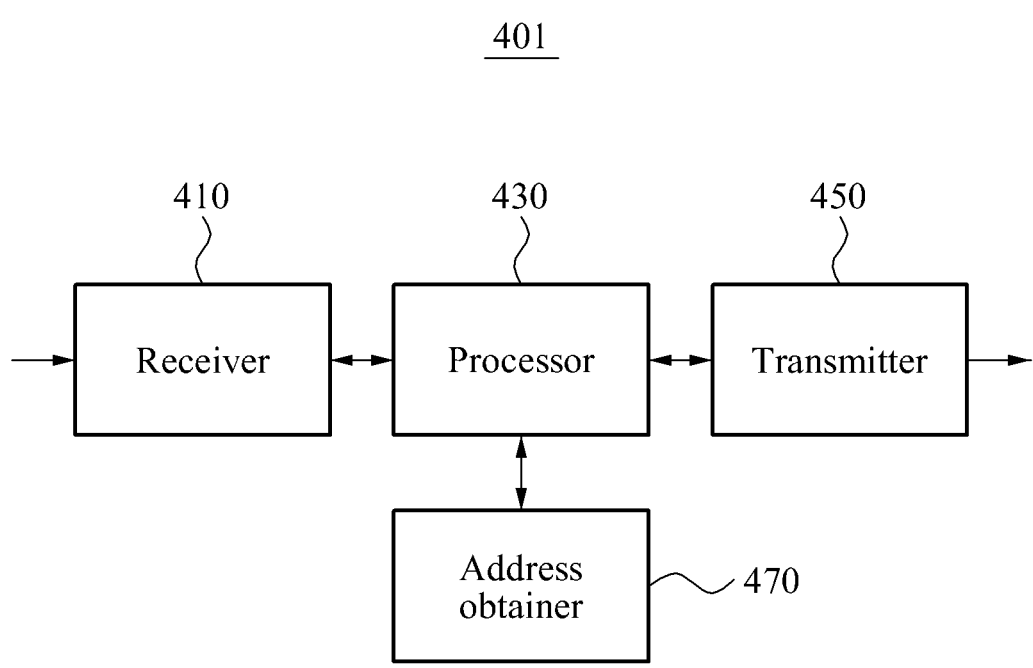
FIG. 4 illustrates an example of a content provider for transmitting a data packet in a name-based network.

FIG. 4 illustrates an example of a content provider for transmitting a data packet in a name-based network.

Referring to FIG. 4, a content provider 401 includes a receiver 410, a processor 430, a transmitter 450, and an obtaining unit 470.

The receiver 410 receives a content request packet from a content requester.

The processor 430 verifies whether a content request packet requesting a content identical to a content of the content request packet received by the receiving unit 410 is present in a PIT of the content provider 401. The processor 430 increases a value of a counter corresponding to the content request packet based on a result of the verification. The processor 430 compares the value of the counter to a predetermined threshold value.

The transmitting unit 450 transmits a data packet using a broadcast MAC address in response to the content request packet being received when the value of the counter is greater than or equal to the threshold value. The broadcast MAC address may be a predefined value, for example, FF:FF:FF:FF:FF:FF.

The transmitter 450 transmits the data packet using the broadcast MAC address in response to the content request packet being received when a next hop node of the data packet corresponds to a node located within a wireless broadcast range and the value of the counter is greater than or equal to the threshold value.

The wireless broadcast range may be, for example, a Wi-Fi downlink.

When the value of the counter is less than the threshold value, the transmitter 450 transmits the data packet in response to the content request packet being received using a unicast MAC address recognized from a CCN over ARP packet corresponding to the content request packet. The transmitter 450 may transmit the data packet a number of times equal to the value of the counter using the unicast MAC address in response to the content request packet being received.

The address obtainer 470 may obtain a unicast MAC address from a MAC address of the content requester included in the content request packet or the CCN over ARP packet corresponding to the content request packet.

In one example, a CCN protocol may be used directly in a layer 3 as a network layer by using the CCN over ARP packet to enable mapping between a layer 2 MAC address and a layer 3 CCN protocol address.

In one example, efficiency of bandwidth usage may be improved by determining whether to transmit a data packet using broadcast dynamically by utilizing data in a PIT of CCN in a wireless broadcast range, such as, for example, a Wi-Fi downlink.

The CCN node 101, the next hop CCN node 109, the content provider 401, the receiver 410, the processor 430, the transmitter 450, and the address obtainer 470 described above that perform the operations illustrated in FIGS. 1 and 2 and that may use the CCN over ARP request packet in FIG. 3 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component or to perform a method may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of transmitting a data packet from a content provider in a content-centric network (CCN), the method comprising:
   verifying whether a content request packet requesting a content identical to a content of a content request packet being received from a content requester is present in a pending interest table (PIT);
   increasing a value of a counter corresponding to the content request packet in response to the content request packet being present in the PIT;
   comparing the value of the counter to a threshold value; and
   transmitting a data packet using a broadcast media access control (MAC) address in response to the content request packet being received and the value of the counter being greater than or equal to the threshold value,
   wherein the transmitting of the data packet comprises transmitting the data packet using a unicast MAC address recognized from the CCN over address resolution protocol (ARP) packet corresponding to a CCN protocol address in response to the content request packet being received and the value of the counter being less than the threshold value.

2. The method of claim 1, wherein the transmitting of the data packet comprises transmitting the data packet using the broadcast MAC address in response to the content request packet being received and a next hop node of the data packet being a node located within a wireless broadcast range and the value of the counter being greater than or equal to the threshold value.

3. The method of claim 1, wherein the threshold value is determined based on an amount of bandwidth usage used to broadcast the data packet.

4. The method of claim 1, wherein the transmitting of the data packet comprises transmitting the data packet a number of times equal to the value of the counter using the unicast MAC address in response to the content request packet being received.

5. The method of claim 1, further comprising obtaining the unicast MAC address from a MAC address of the content requester included in the content request packet or the CCN over ARP packet corresponding to the content request packet.

6. The method of claim 5, wherein the protocol address of the CCN over ARP packet comprises a unique identifier of a CCN node.

7. The method of claim 6, wherein the unique identifier comprises a hash value of a public key of the CCN node.

8. The method of claim 5, wherein a length of the unique identifier is variable.

9. The method of claim 5, wherein the CCN over ARP packet comprises any one or any combination of a CCN protocol type, a CCN protocol address length, a sender protocol address, and a target node protocol address.

10. The method of claim 9, wherein the CCN protocol address length is determined based on a longer length among a length of the sender protocol address and a length of the target node protocol address.

11. The method of claim 9, wherein a shorter protocol address is padded using one or more end marker bytes to make a length of the shorter protocol address length equal to the CCN protocol address length in response to the sender protocol address or the target node protocol address being shorter than the CCN protocol address length.

12. The method of claim 9, wherein the sender protocol address comprises a unique identifier of a sender; and
the target node protocol address comprises a unique identifier of a target node.

13. The method of claim 1, wherein a program to transmit the data packet from the content provider in the CCN is stored on a non-transitory computer-readable storage medium.

14. A content provider for transmitting a data packet in a content-centric network (CCN), the content provider comprising:
a receiver configured to receive a content request packet from a content requester;
a processor configured to:
verify whether a content request packet requesting an identical content is present in a pending interest table (PIT) in response to the content request packet being received;
increase a value of a counter corresponding to the content request packet in response to the content request packet being present in the PIT; and
compare the value of the counter to a predetermined threshold value; and
a transmitter configured to transmit a data packet using a predefined broadcast media access control (MAC) address in response to the content request packet being received and the value of the counter being greater than or equal to the threshold value,
wherein the transmitter is further configured to transmitting the data packet using a unicast MAC address recognized from the CCN over address resolution protocol (ARP) packet corresponding to a CCN protocol address in response to the content request packet being received and the value of the counter being less than the threshold value.

15. The content provider of claim 14, wherein the transmitter is further configured to transmit the data packet, in response to the content request packet being received, using the broadcast MAC address in response to a next hop node of the data packet being a node located within a wireless broadcast range and the value of the counter being greater than or equal to the threshold value.

16. The content provider of claim 14, wherein the transmitter is further configured to transmit the data packet a number of times equal to the value of the counter using the unicast MAC address in response to the content request packet being received.

17. The content provider of claim 14, wherein the processor is further configured to obtain the unicast MAC address from a MAC address of the content requester included in the content request packet or the CCN over ARP packet corresponding to the content request packet.

18. A method of transmitting a data packet from a content provider in a content-centric network (CCN), the method comprising:
verifying whether a content request packet requesting a content identical to a content of a content request packet being received from a content requester is present in a pending interest table (PIT);
increasing a value of a counter corresponding to the content request packet based on a result of the verification in response to the content request packet being present in the PIT;
comparing the value of the counter to a threshold value;
determining how to transmit a data packet;
transmitting the data packet in response to the content request packet being received and a result of the comparing,
wherein the determining comprises determining to transmit the data packet using a unicast media access control (MAC) address recognized from the CCN over address resolution protocol (ARP) packet corresponding to a CCN protocol address in response to the value of the counter being less than the threshold value; and
determining to transmit the data packet using a predefined broadcast MAC address in response to the content request packet being received and the value of the counter being greater than or equal to the threshold value.

19. The method of claim 18, further comprising searching a forwarding information base (FIB) for an entry corresponding to the content packet in response to the content request packet not being present in the PIT.

* * * * *